United States Patent [19]

Frankstein et al.

[11] Patent Number: 4,816,277

[45] Date of Patent: Mar. 28, 1989

[54] METHOD FOR HUSKING CORN

[75] Inventors: Boris Frankstein, Rehovot; Monick Lev, Kfar Saba, both of Israel

[73] Assignee: State of Israel-Ministry of Agriculture, Bet Dagan, Israel

[21] Appl. No.: 910,003

[22] Filed: Sep. 19, 1986

[30] Foreign Application Priority Data

Sep. 22, 1985 [IL] Israel ........................ 76450

[51] Int. Cl.⁴ .............................. A23L 1/212
[52] U.S. Cl. ..................... 426/482; 426/518
[58] Field of Search ............... 426/482, 481, 518

[56] References Cited

U.S. PATENT DOCUMENTS

3,029,850  4/1962  Reid ........................ 426/482
3,592,249  7/1971  Ross ........................ 426/481
3,605,844  9/1971  Oldershaw ................. 426/481

Primary Examiner—George Yeung
Attorney, Agent, or Firm—Marshall, O'Toole, Gerstein, Murray & Bicknell

[57] ABSTRACT

A method for partial husking of an ear of corn including a first cutting step of partially cutting through the ear of corn at a first end thereof, thus separating a first end of the ear joined to a first part of the husk from the remainder of the ear; a first removing step of removing the first end of the ear together with the first part of the husk from the ear; a second cutting step of partially cutting through the ear of corn at a second end thereof; a second removing step of removing the second end of the ear together with the second part of the husk from the ear; and trimming the remaining part of the husk.

5 Claims, 9 Drawing Sheets

METHOD FOR HUSKING CORN

FIELD OF THE INVENTION

The present invention relates to food processing apparatus and methods and more particularly to the processing of fresh sweet corn.

BACKGROUND OF THE INVENTION

In recent years, fresh sweet corn is presented to the consumer at the point of sale in transparent wrapping with part of the husk removed to expose one or more rows of kernels. Such presentation is preferable to complete husking, which has a deleterious effect on freshness and shelf-life of the produce.

Prior to the advent of the present invention, the partial husking of the corn to prepare it for sale had been carried out by hand, a difficult and time-consuming task.

SUMMARY OF THE INVENTION

The present invention seeks to provide an apparatus and method for partial husking of fresh sweet corn.

There is thus provided in accordance with a preferred embodiment of the present invention apparatus for partial husking of an ear of corn including first cutting apparatus for partially cutting through the ear of corn, permitting removal of one end thereof together with a first part of the husk from the remainder of the ear.

Additionally, in accordance with an embodiment of the invention, the apparatus for partial husking also includes second cutting apparatus for partial cutting through the ear of corn and permitting removal of an opposite end of the ear together with a second part of the husk from the ear and trimming the remaining part of the husk.

Additionally, in accordance with a preferred embodiment of the present invention, there is provided apparatus for rotating the ear of corn by a predetermined amount intermediate the first cutting apparatus and the second cutting apparatus.

Further, in accordance with a preferred embodiment of the present invention, there is provided apparatus for aligning the ear of corn with respect to its tip intermediate the first cutting apparatus and the second cutting apparatus.

Additionally, in accordance with a preferred embodiment of the present invention, the first cutting apparatus comprises a cutting element having a recessed cutting portion which engages the ear of corn.

Further, in accordance with an embodiment of the invention there is provided, in association with the first and second cutting apparatus, resilient roller apparatus for engaging the removed portions and diverting them for separate collection.

There is also provided, in accordance with a preferred embodiment of the present invention, a method for partial husking of an ear of corn including a first cutting step of partially cutting through the ear of corn at a first end thereof and a step of removing a first end of the ear together with a first part of the husk from the ear.

Additionally, in accordance with an embodiment of the invention, there is also provided a second cutting step of partially cutting through the ear of corn at a second end thereof, followed by the steps of removing the opposite end of the ear together with a second part of the husk from the ear and trimming the remaining part of the husk.

Additionally, in accordance with a preferred embodiment of the present invention, there is provided an intermediate step of rotating the ear of corn by a predetermined amount intermediate the first cutting step and the second cutting step. Further in accordance with a preferred embodiment of the present invention, there is provided a step of aligning the ear of corn with respect to its tip intermediate the first cutting step and the second cutting step.

Additionally, in accordance with a preferred embodiment of the present invention, the first cutting step comprises engaging a recessed cutting portion of a cutting element with the ear of corn.

Further, in accordance with an embodiment of the invention, there are provided in association with the first and second cutting steps the steps of causing the removed parts to engage resilient roller apparatus for diverting them for separate collection.

BRIEF DESCRIPTION OF THE DRAWINGS

The present invention will be understood and appreciated more fully from the detailed description which follows, taken in conjunction with the drawings in which.

DETAILED DESCRIPTION OF A PREFERRED EMBODIMENT

Reference is now made to FIGS. 1–19 which illustrate the basic principles of operation of the invention. Initially, reference is made to FIGS. 3A–3C, 4A and 4B to provide an understanding of the basic steps undertaken in accordance with a preferred embodiment of the invention. FIG. 3A illustrates a whole ear of corn prior to processing in accordance with the invention.

Figure 3A:
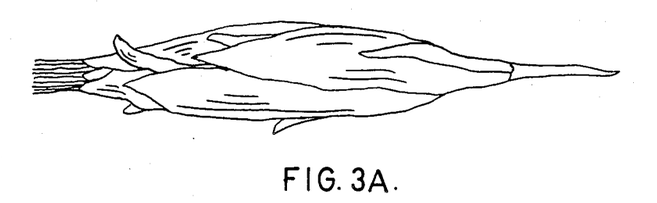
FIGS. 3A, 3B and 3C are three sequential illustrations of the partial husking process of the present invention.
Figure 3B:
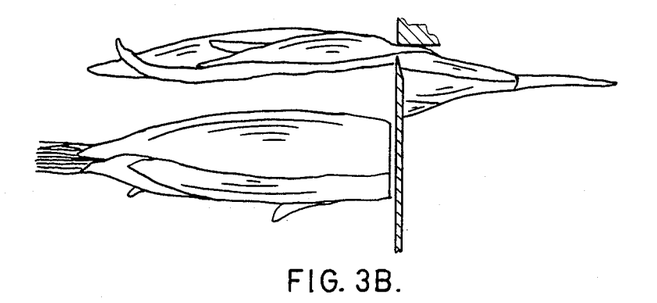
Figure 3C:
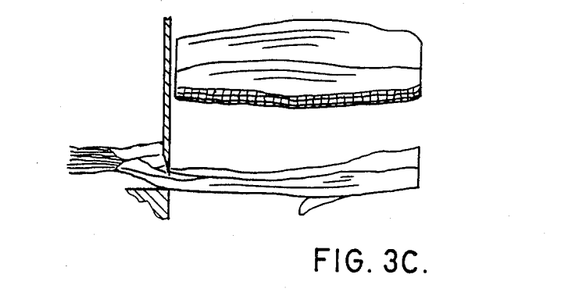
Figure 4A:
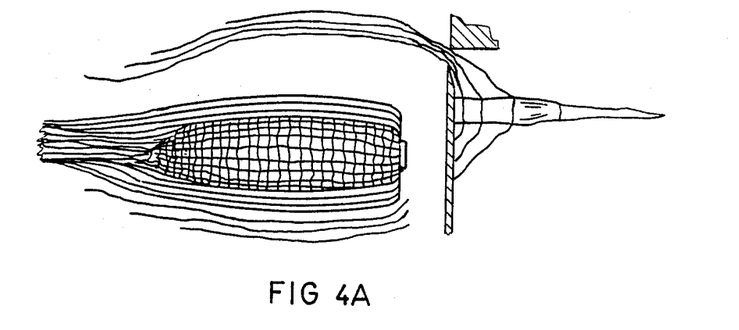
FIGS. 4A and 4B are two sequential illustrations in partial section which correspond to FIGS. 3B and 3C respectively.
Figure 4B:
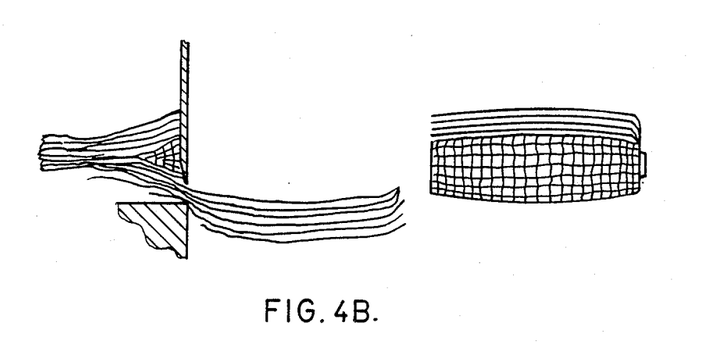
Figure 5:
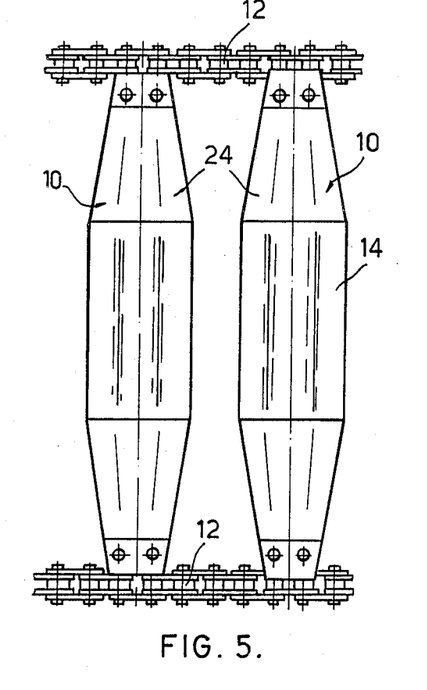
FIG. 5 is a top view illustration of part of the conveyor apparatus employed in the apparatus of FIGS. 1 and 2.
Figure 6:
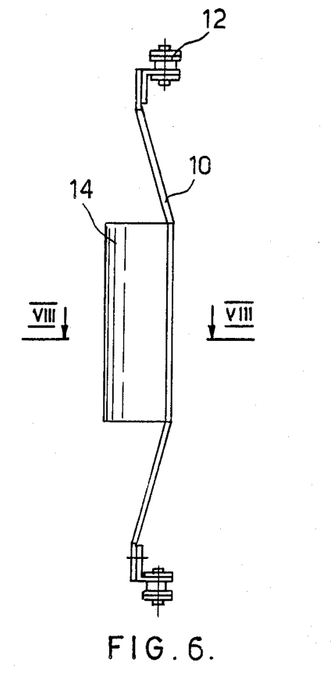
FIG. 6 is a side view illustration of the apparatus of FIG. 5.
Figure 7:
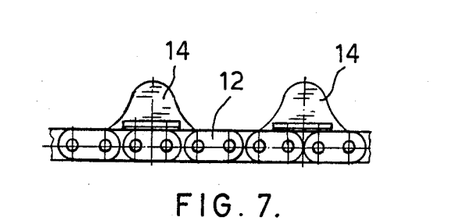
FIG. 7 is an end view illustration of the apparatus of FIG. 5.

FIGS. 3B and 4A show the ear of corn after a first cut, which extends only partially through the ear of corn, whereby the stem together with an outer part of one side of the husk is removed from the ear. FIGS. 3C and 4B show the ear of corn after a second partial cut has been made, this time removing the entire other side of the husk and the tip as well as trimming the remaining inner part of the husk.

Figure 1:
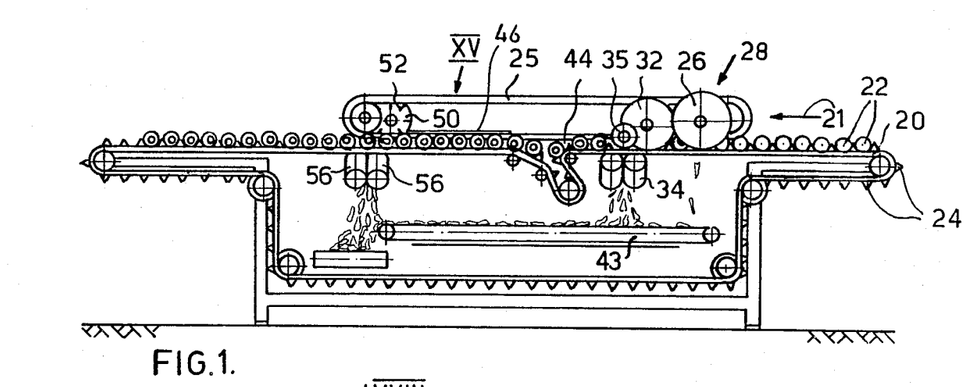
FIG. 1 is a side view illustrating of apparatus for partial husking of fresh corn constructed and operative in accordance with a preferred embodiment of the present invention.
Figure 2:
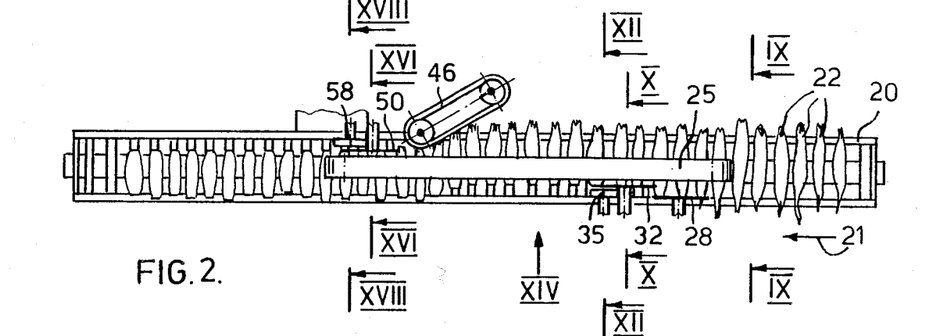
FIG. 2 is a partial top view illustration of the apparatus of FIG. 1.

Turning now to FIGS. 1 and 2, there is seen apparatus for partial husking of fresh corn in accordance with a preferred embodiment of the present invention. An endless conveyor 20 is provided and driven by suitable driving apparatus, such as an electric motor (not shown), in a direction indicated by arrows 21. The conveyor is adapted to receive individual ears of corn 22 between individual corn ear holding conveyor units 24 such that unwanted rotation of the ears is generally prevented. Units 24 are illustrated in detail in FIGS. 5–8. It is seen that units 24 each comprise a support bar 10 which is mounted on opposite conveyor chains 12. Mounted on the support bar, intermediate between chains 12 is a convexly curved separation member 14 having a concave base configuration indicated at reference numeral 16. The individual ears of corn are placed between adjacent separation members 14.

In order to provide secure support and prevent unwanted rotation or other movement of the corn ears on the conveyor during processing, the ears are also engaged from above during the various processing steps by an endless moving engagement belt 25 whose linear speed is synchronized with that of the conveyor 20.

Figure 9:
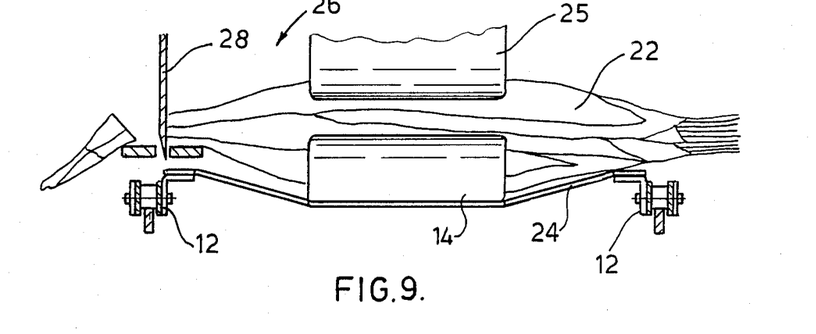
FIG. 9 is a sectional illlustration taken along the lines IX—IX in FIG. 2.
Figure 10:
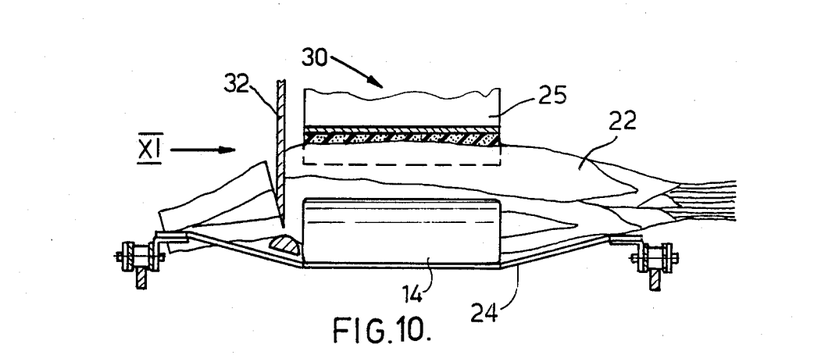
FIG. 10 is a sectional illustration taken along the lines X—X in FIG. 2.
Figure 11:
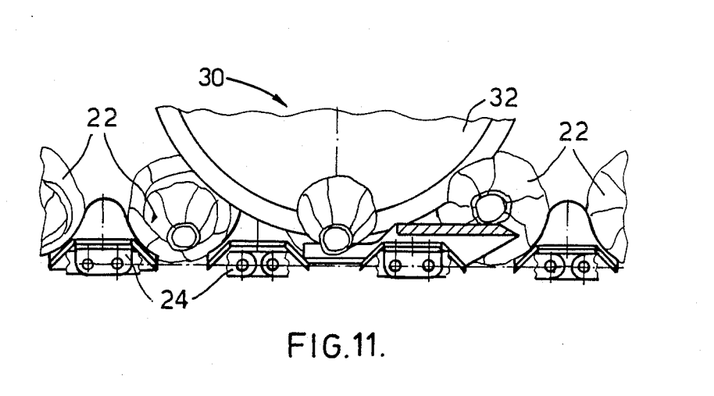
FIG. 11 is a side view illustration taken in the direction indicated by the arrow XI in FIG. 10.

The ears of corn, in the form illustrated generally in FIG. 3A, typically are initially presented to a stem trimming station 26 which includes a stem end trimmer 28 and is illustrated in detail in FIG. 9. Following the stem end trimming station 26, the trimmed corn ears engage a first partial cutting station 30, which is illustrated in detail in FIGS. 10 and 11, and includes a conventional rotary stem trimming cutter 32, which cuts partially through the ear of corn, not cutting through a lower portion of the husk.

As a result of the action of cutter 32, the stem and a bottom portion of the husk remain joined, as illustrated in Figs. 3B and 4A, thus easily removed as a single unit from the remainder of the ear.

Figure 12:
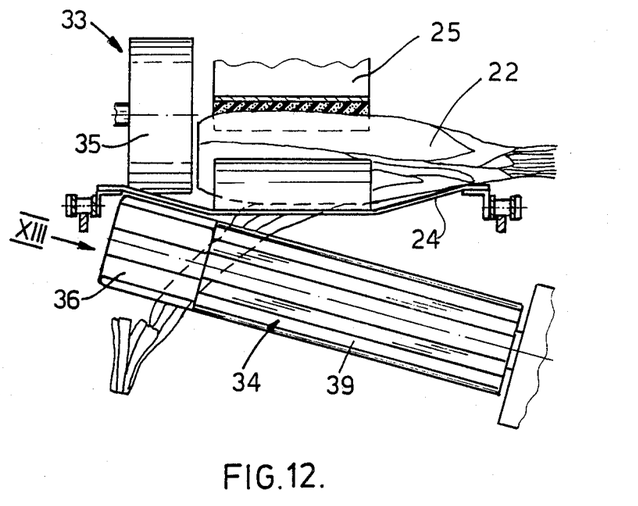
FIG. 12 is a sectional illustration taken along the lines XII—XII in FIG. 2.
Figure 13:
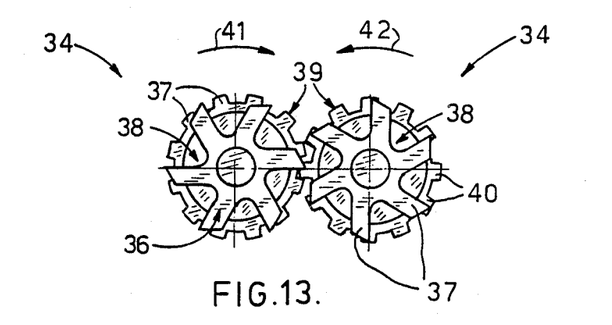
FIG. 13 is an end view of rollers employed in the embodiment of FIG. 12, taken along a direction indicated by arrow XIII in FIG. 12.

The removal of the stem and joined bottom husk portion from the remainder of the ear is achieved by a first removal station 33, illustrated in detail in FIGS. 12 and 13 and including a pair of cooperating removal rollers 34 and a top pusher roller 35.

The removal rollers 34 each have two sections, including a first section 36, arranged to receive a relatively thick and hard stem portion of the ear, that defines a plurality of outwardly extending engagement teeth 37 having relatively deep recesses 38 defined therebetween. A second section 39 defines a cylindrical array of short protrusions 40 thereon and is intended to engage the lower part of the husk which remains joined to the stem due to the partial cutting described hereinabove. The rollers 34 rotate in opposite directions indicated by arrows 41 and 42, so as to draw the joined stem and bottom husk portion away from the ear in a downward direction onto a refuse conveyor 43.

Figures 14, 15:
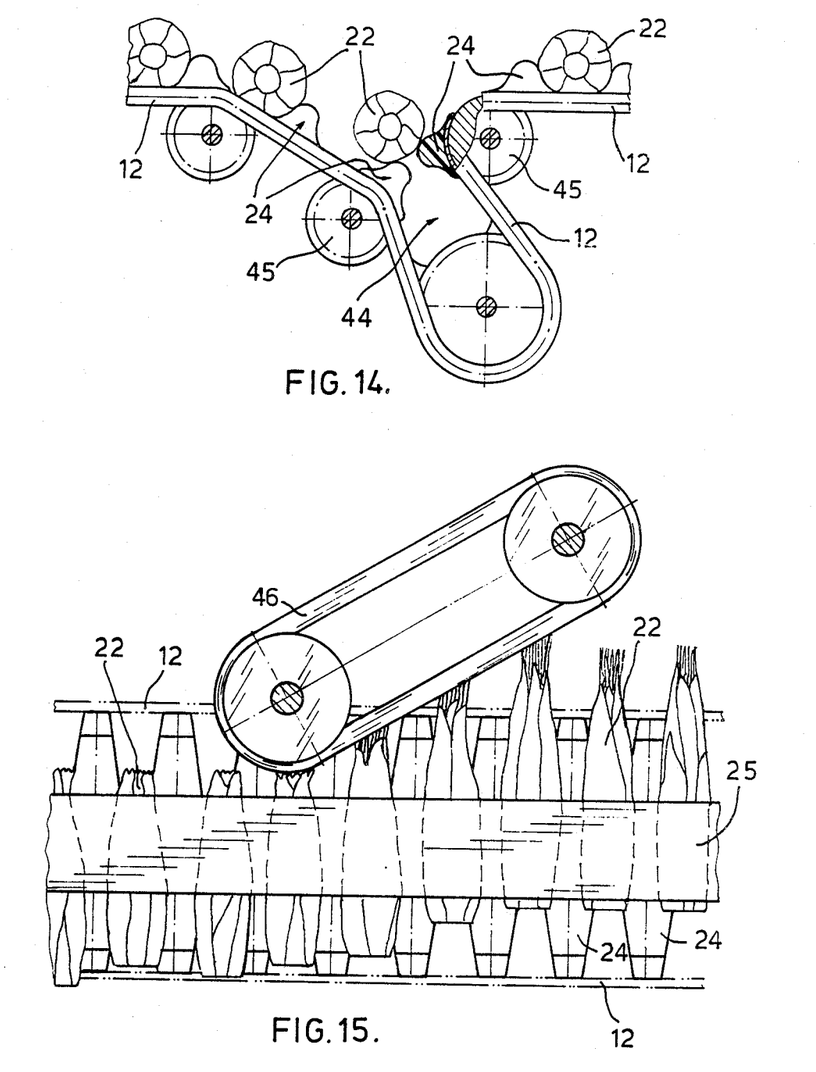
FIG. 14 is a detailed side view sectional illustration of a portion of the apparatus of FIGS. 1 and 2 at a region indicated by an arrow XIV.
FIG. 15 is a detailed top view sectional illustration of a portion of the apparatus of FIGS. 1 and 2 at a region indicated by an arrow XV.
Figure 16:
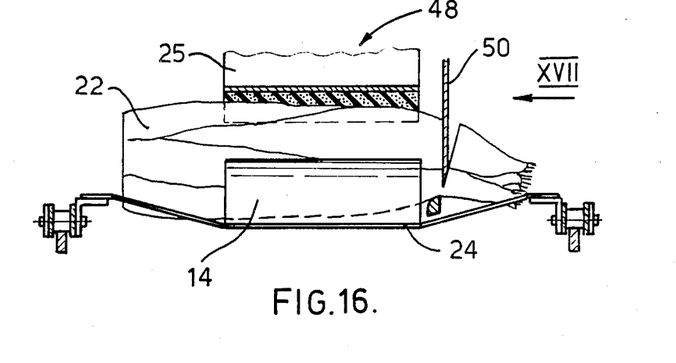
FIG. 16 is a sectional illustration taken along the lines XVI—XVI in FIG. 2.

Following the removal station 33 the conveyor 20 defines an inward fold 44, illustrated in detail in FIG. 14, wherein corn ears 22 are rolled by gravity from their given niche between conveyor units 24 into other niches between other conveyor units 24 such that with respect to any given set of adjacent conveyor units 24, the corn is rotated by approximately 180 degrees about its longitudinal axis.

Figure 8:
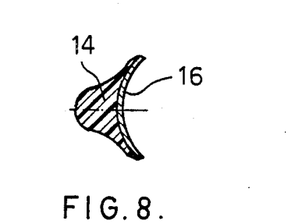
FIG. 8 is a sectional view illustration of the apparatus of FIG. 5 taken along the lines VIII—VIII in FIG. 6.

It is noted that the concave configuration of the separation members 14, indicated in FIG. 8 at reference numeral 16, enables precise positioning of the separation members 14 with respect to rollers 45, detailed in FIG. 14, which define the arrangement of the conveyor units 24 at the fold 44.

Figure 17:
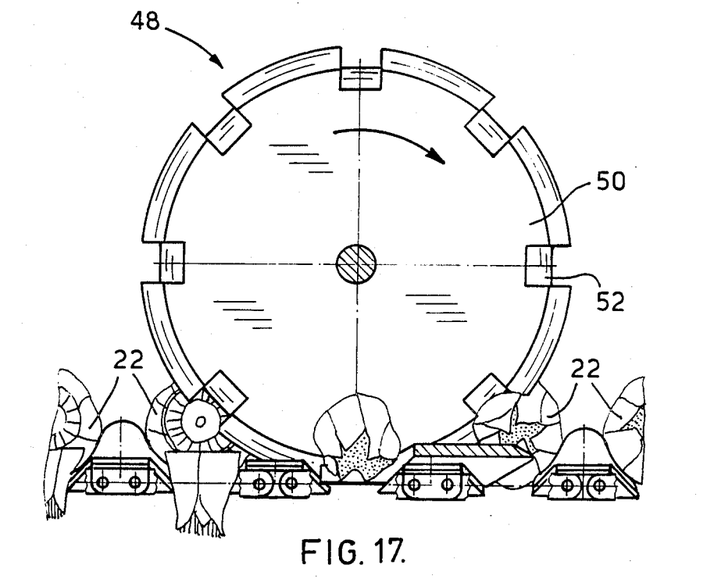
FIG. 17 is an end view of cutting apparatus employed in the embodiment of FIG. 16, taken along a direction indicated by arrow XVII in FIG. 16.

Following the 180 degree rotation, the ears of corn are uniformly arranged at their tips typically by a pushing belt 46, illustrated in detail in FIG. 15. Once aligned with their tips generally in a single plane, as shown in FIG. 15, the ears are conveyed to a second partial cutting station 48, illustrated in detail in FIGS. 16 and 17. Station 48 comprises a synchronized tip cutter 50, which is formed with notches whereby the bottom portion of the husk underlying the notch is not cut. Cutter 50 is rotated at a speed which causes each notch to precisely meet and cut a corresponding ear of corn in synchronization, as illustrated in FIG. 17. The result of cutting at stage 48 is illustrated in FIGS. 3C and 4B, it being noted that the tip and part of the husk are retained as a single unit.

Figure 18:
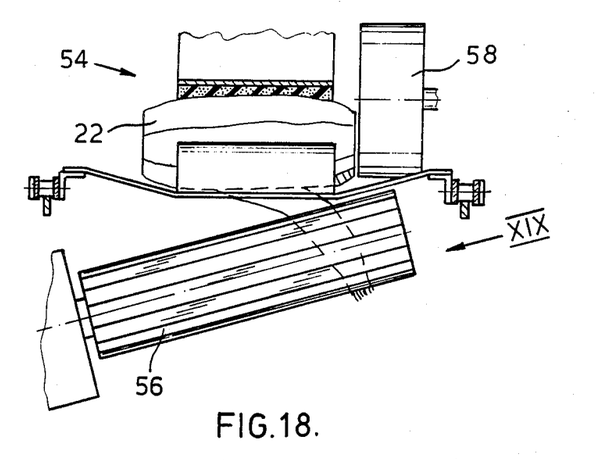
FIG. 18 is a sectional illustration taken along the lines XVIII—XVIII in FIG. 2.
Figure 19:
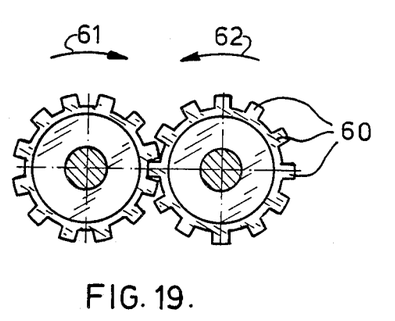
FIG. 19 is an end view of rollers employed in the embodiment of FIG. 18, taken along a direction indicated by arrow XIX in FIG. 18.

Following station 48, the ear engages a second removal stage 54, which is illustrated in detail in FIGS. 18 and 19 and including a pair of cooperating removal rollers 56 and a top pusher roller 58. The removal rollers 56 each define a cylindrical array of short protrusions 60 thereon and are intended to engage the lower part of the husk which remains joined to the tip due to the second partial cutting described hereinabove. The rollers 56 rotate in opposite directions indicated by arrows 61 and 62, so as to draw the joined stem and bottom husk portion away from the ear in a downward direction.

The remaining, partially husked, trimmed corn may be removed from the conveyor by any suitable means for further processing and/or packaging.

It is noted that the present invention has been described in the form of a fully automated processing line. The invention may also be embodied in a less automated or totally non-automated form wherein one or more partially cutting steps are carried out to enable ease of partial husking. Intermediate these two extremes are the possibility of eliminating the ear rotating step intermediate the two cutting steps.

It will be appreciated by persons skilled in the art that the present invention is not limited by what has been particularly shown and described hereinabove. Rather the scope of the invention is defined only by the claims which follow:

We claim:

1. A method for partial husking of an ear of corn including:
   a first cutting step of partially cutting through the ear of corn at a first end thereof transversely to the longitudinal axis of the ear, thus separating a first end of the ear joined to a first end of the husk from the remainder of the ear;
   a first removing step of removing the first end of the ear together with a first part of the husk from the ear;
   a second cutting step of partially cutting through the ear of corn at a second end thereof transverse to said longitudinal axis;
   a second removing step of removing the second end of the ear together with a second part of the husk from the ear, thus separating a second end of the ear joined to a second end of the husk from the remainder of the ear; and
   trimming the remaining part of the husk.

2. A method according to claim 1 and also comprising the step of rotating the ear of corn intermediate the first and the second cutting steps.

3. A method according to claim 1 and also comprising the step of aligning the ear of corn with respect to its tip intermediate the first and the second cutting steps.

4. A method according to claim 1 and wherein said first and second removing steps include the step of engaging a recessed cutting portion of a cutting element with the ear of corn.

5. A method according to claim 1 and also comprising in association with the first and second removing steps the steps of causing the first and second ends of the ear and the parts of the husk joined thereto to engage resilient roller apparatus for diverting them for separate collection.

* * * * *